US012779352B2

(12) United States Patent
Wang

(10) Patent No.: US 12,779,352 B2
(45) Date of Patent: Nov. 3, 2026

(54) CARD-READING DRAWING ROBOT

(71) Applicant: Shenzhen Winztry Technology Co., Ltd., Shenzhen (CN)

(72) Inventor: Yanliang Wang, Shenzhen (CN)

(73) Assignee: Shenzhen Winztry Technology Co., Ltd., Shenzhen (CN)

(*) Notice: Subject to any disclaimer, the term of this patent is extended or adjusted under 35 U.S.C. 154(b) by 0 days.

(21) Appl. No.: 19/216,826

(22) Filed: May 23, 2025

(65) Prior Publication Data

US 2026/0325984 A1 Oct. 22, 2026

(30) Foreign Application Priority Data

Apr. 22, 2025 (CN) ........................ 202520773002.8

(51) Int. Cl.

| | |
|---|---|
| ***A63H 13/15*** | (2006.01) |
| ***B25J 9/00*** | (2006.01) |
| ***B25J 9/16*** | (2006.01) |
| ***B25J 11/00*** | (2006.01) |
| ***B25J 15/00*** | (2006.01) |
| ***B25J 15/04*** | (2006.01) |

(52) U.S. Cl.

CPC ............ *A63H 13/15* (2013.01); *B25J 9/0009* (2013.01); *B25J 9/1661* (2013.01); *B25J 11/005* (2013.01); *B25J 15/0038* (2013.01); *B25J 15/0441* (2013.01)

(58) Field of Classification Search

CPC ................ B25J 11/0075; B25J 15/0038; B25J 15/0441; B25J 9/0009; B25J 9/1661; B44B 3/009; A63H 13/15; G05B 2219/40083

USPC ........................................................ 446/146

See application file for complete search history.

(56) References Cited

U.S. PATENT DOCUMENTS

| | | | | |
|---|---|---|---|---|
| D1,058,630 S * | 1/2025 | Guo | ............................. | D15/199 |
| 2009/0255137 A1* | 10/2009 | Apkarian | ................ | B44B 3/009 33/23.01 |
| 2025/0010492 A1* | 1/2025 | Yu | ........................... | B23P 19/12 |
| 2026/0084318 A1* | 3/2026 | Gavrilin | ............... | B25J 11/0075 |

FOREIGN PATENT DOCUMENTS

CN 216000547 U * 3/2022

* cited by examiner

*Primary Examiner* — Minnah L Seoh
*Assistant Examiner* — Gergory T Prather

(57) ABSTRACT

This application relates to the technical field of card-reading drawing robots, specifically to a card-reading drawing robot. The card-reading drawing robot includes a housing, a drive mechanism, and a drawing arm mechanism, where two ends of the sleeving member are respectively provided with a first sleeving cavity and a second sleeving cavity, a first end of the first connection arm is inserted into the first sleeving cavity, a second end of the first connection arm is connected to the drive mechanism, and a first end of the second connection arm is inserted into the second sleeving cavity. The first end of the first connection arm is provided with a first magnetic piece, the first end of the second connection arm is provided with a second magnetic piece, and the first magnetic piece and the second magnetic piece are magnetically attracted.

14 Claims, 9 Drawing Sheets

CARD-READING DRAWING ROBOT

CROSS REFERENCE TO RELATED APPLICATIONS

The present application claims the benefit of Chinese Patent Application No. 202520773002.8 filed on Apr. 22, 2025, the contents of which are incorporated herein by reference in their entirety.

FIELD OF TECHNOLOGY

This application relates to the technical field of card-reading drawing robots, particularly to a card-reading drawing robot.

BACKGROUND

A card-reading drawing robot is a robot capable of performing drawing by reading card information. Card-reading drawing robots are typically equipped with corresponding cards. The robot can obtain drawing information by scanning image recognition code on the card, recognizing image information on the card via a camera, or recognizing image information via an NFC sensor chip. The card-reading drawing robot draws a corresponding pattern on the card based on the obtained image information.

Card-reading drawing robots are primarily aimed at children, stimulating their interest in drawing in a fun way, helping them learn drawing techniques, and enhancing their drawing skills. In the field of education, card-reading drawing robots can serve as auxiliary tools to assist teachers in conducting drawing lessons and enriching teaching content.

Card-reading drawing robots typically perform drawing actions by holding a drawing pen with a flexibly rotatable connection arm. Specifically, the connection arm of the card-reading drawing robot is clamped onto a spherical connection part via a C-shaped slot. Although the C-shaped slot and the spherical connection part are further connected by magnetic attraction, the connection remains insufficiently secure.

SUMMARY

According to embodiments of this application, a card-reading drawing robot is provided to address the issue that a connection arm of a card-reading drawing robot is clamped onto a spherical connection part via a C-shaped slot, and although the C-shaped slot and the spherical connection part are further connected by magnetic attraction, the connection remains insufficiently secure.

The card-reading drawing robot disclosed in this application includes a housing, a drive mechanism, and a drawing arm mechanism, where the drive mechanism is mounted in the housing, the drawing arm mechanism is configured to mount a drawing pen, and the drive mechanism is configured to drive the drawing arm mechanism to perform a drawing action.

The drawing arm mechanism includes a first connection arm, a second connection arm, and a sleeving member, where two ends of the sleeving member are respectively provided with a first sleeving cavity and a second sleeving cavity, a first end of the first connection arm is inserted into the first sleeving cavity, a second end of the first connection arm is connected to the drive mechanism, and a first end of the second connection arm is inserted into the second sleeving cavity.

The first end of the first connection arm is provided with a first magnetic piece, the first end of the second connection arm is provided with a second magnetic piece, and the first magnetic piece and the second magnetic piece are magnetically attracted.

Optionally, the first end of the first connection arm is provided with a first mounting cavity, the first magnetic piece is mounted in the first mounting cavity, the first end of the second connection arm is provided with a second mounting cavity, and the second magnetic piece is mounted in the second mounting cavity.

The first mounting cavity is detachably inserted into the first sleeving cavity, and the second mounting cavity is fixedly inserted into the second sleeving cavity.

Optionally, the drawing arm mechanism further includes a sleeving cover, and the first end of the first connection arm is inserted into the first sleeving cavity via the sleeving cover.

Optionally, two foolproof ribs with different shapes are oppositely disposed on an outer peripheral wall of the sleeving cover, and a peripheral wall of the first sleeving cavity is provided with two foolproof slots respectively corresponding to the two foolproof ribs; and/or the sleeving member has a partition plate separating the first sleeving cavity and the second sleeving cavity, a bottom of the sleeving cover is provided with a limiting protrusion, the partition plate is provided with a first limiting slot or a limiting hole corresponding to the limiting protrusion, and the limiting protrusion is inserted into the first limiting slot or the limiting hole.

Optionally, an outer peripheral wall of the second mounting cavity is axially provided with a second limiting slot, an inner peripheral wall of the second sleeving cavity is axially provided with a limiting rib, and the limiting rib is embedded in the second limiting slot; and/or the outer peripheral wall of the second mounting cavity is circumferentially provided with a first snap slot, the inner peripheral wall of the second sleeving cavity is circumferentially provided with a first snap protrusion, and the first snap protrusion is snapped into the first snap slot.

Optionally, the card-reading drawing robot further includes a base and an inner frame liftably mounted in the housing, and the inner frame covers the base to form an inner transmission cavity.

The drive mechanism includes a lift drive assembly and a rotation drive member, the lift drive assembly is drivingly connected to the base, so as to drive the base to ascend and descend, and the rotation drive member is mounted at a bottom of the base.

In the inner transmission cavity, the base is recessed with a mounting groove, a drive shaft of the rotation drive member passes through the mounting groove and extends into the inner transmission cavity, and the second end of the first connection arm is mounted on the drive shaft of the rotation drive member and located at the mounting groove.

Optionally, a torsion spring sleeves the second end of the first connection arm, one end of the torsion spring is fixed in the mounting groove, and the other end is fixed to the first connection arm.

Optionally, a magnet is mounted at an end of the second end of the first connection arm away from the mounting groove, a Hall angle sensor is mounted on the inner frame corresponding to the magnet, and the Hall angle sensor is configured to detect a rotation angle of the first connection arm.

Optionally, the housing includes an upper housing and a lower housing assembled in a mutually fitting manner, the card-reading drawing robot further includes a top seat, and the top seat is mounted in the upper housing and covers the inner frame within the housing.

A main control circuit board and a battery are mounted on the top seat, and the main control circuit board is electrically connected to all the battery, the lift drive assembly, and the rotation drive member.

Optionally, the housing is further provided with a visual recognition module, the visual recognition module is configured to recognize an object within a visual range, and the card-reading drawing robot executes a drawing action based on visual recognition information.

The beneficial effect of the card-reading drawing robot provided by the embodiments of this application lies in that: the first connection arm and the second connection arm of the card-reading drawing robot of this application are connected via the sleeving member, where two ends of the sleeving member are respectively provided with the first sleeving cavity and the second sleeving cavity. The first end of the first connection arm is inserted into the first sleeving cavity, and the first end of the second connection arm is inserted into the second sleeving cavity. Additionally, the first end of the first connection arm is provided with the first magnetic piece, the first end of the second connection arm is provided with the second magnetic piece, and the first magnetic piece and the second magnetic piece are magnetically attracted. Thus, since the first end of the first connection arm is inserted into the first sleeving cavity and the first end of the second connection arm is inserted into the second sleeving cavity, mounting is more secure compared to the C-shaped slot clamping, and the magnetic attraction between the first magnetic piece and the second magnetic piece further enhances the firmness between the first connection arm and the second connection arm.

BRIEF DESCRIPTION OF THE DRAWINGS

The technical solutions of this application will be further described in detail below with reference to the drawings and embodiments. In the drawings.

The reference numerals in the drawings are.

Figure 1:
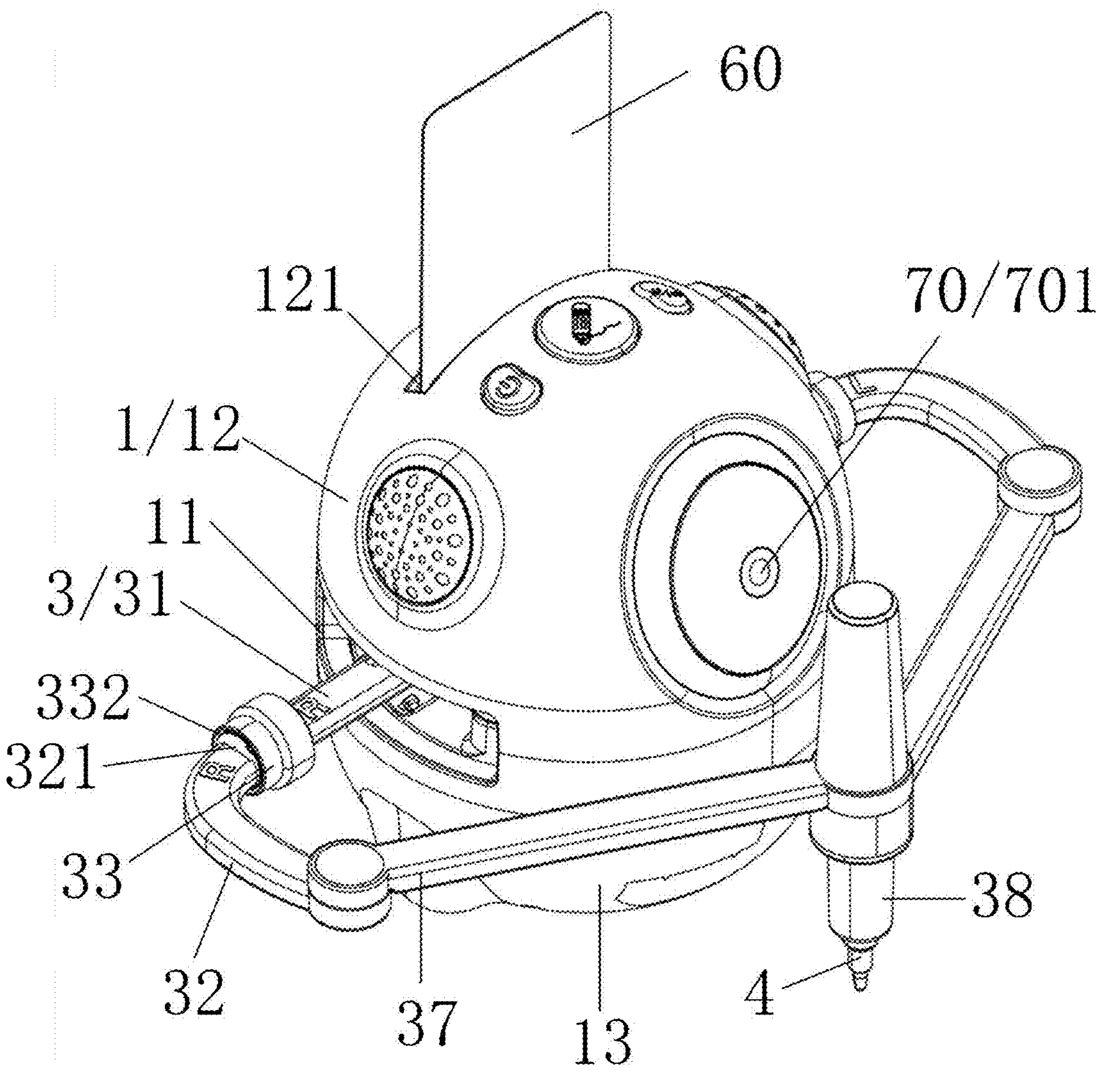
FIG. 1 is a schematic diagram of a card-reading drawing robot according to an embodiment of this application.
Figure 2:
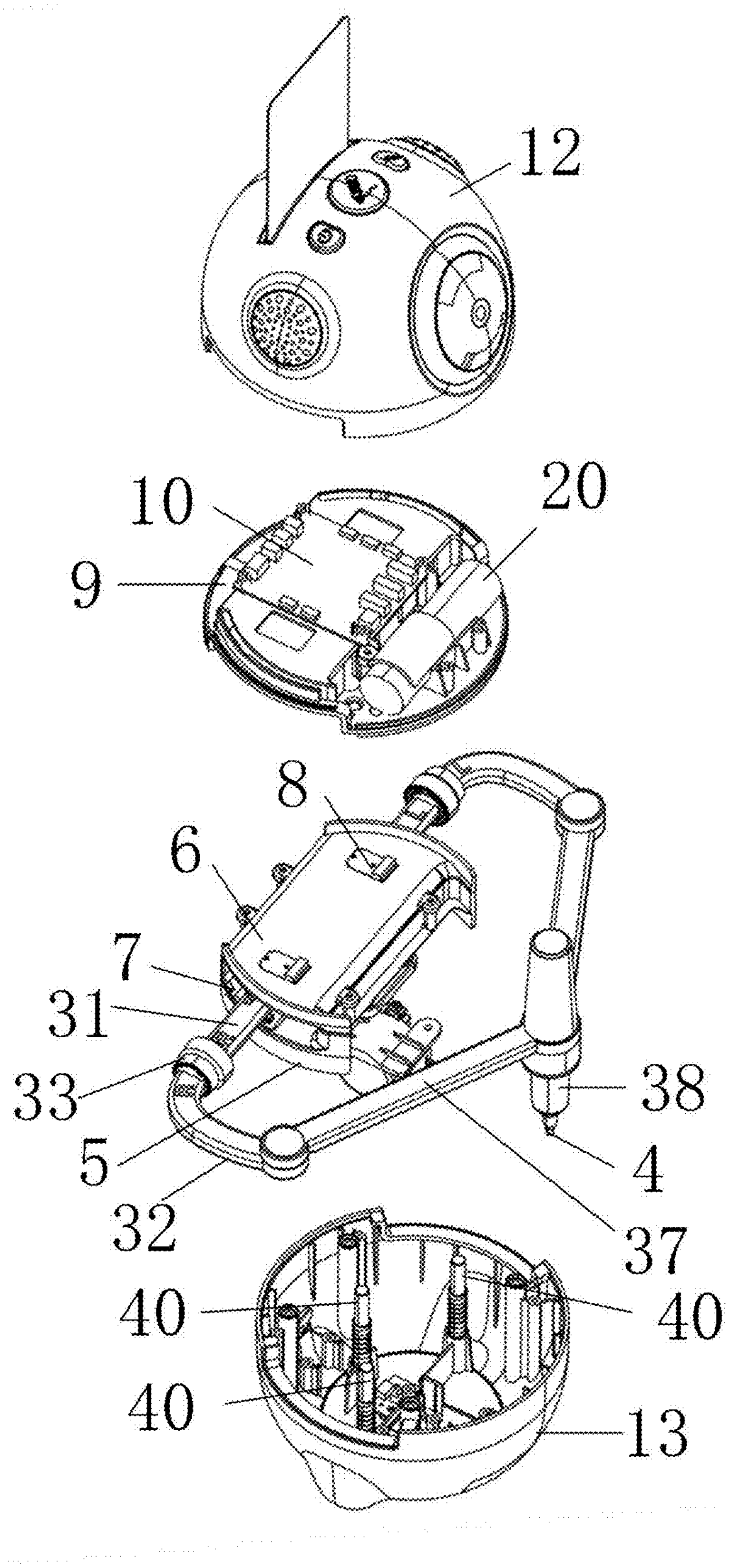
FIG. 2 is an exploded schematic diagram of the card-reading drawing robot according to an embodiment of this application.
Figure 3:
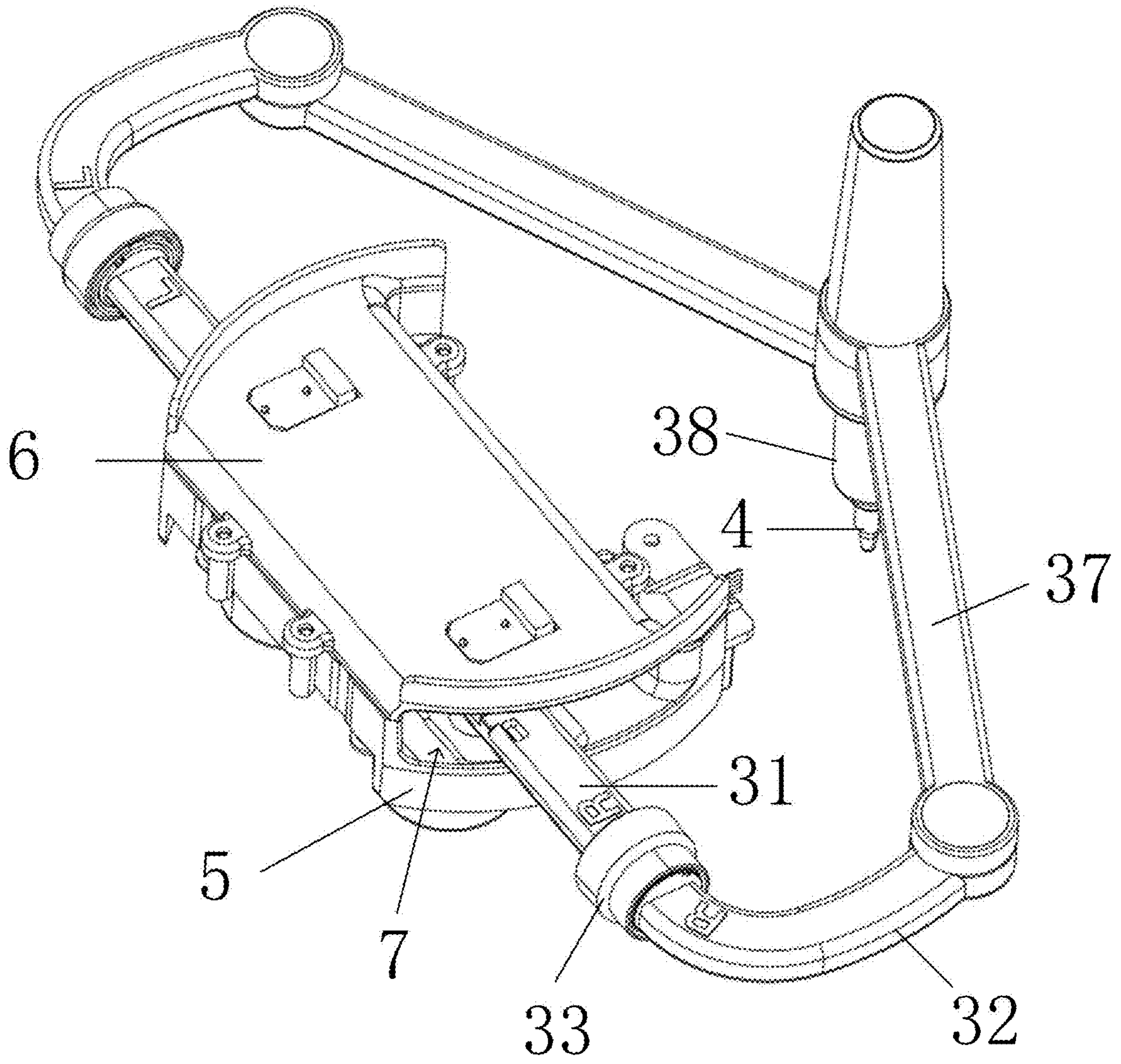
FIG. 3 is a schematic diagram of a drawing arm mechanism according to an embodiment of this application.
Figure 4:
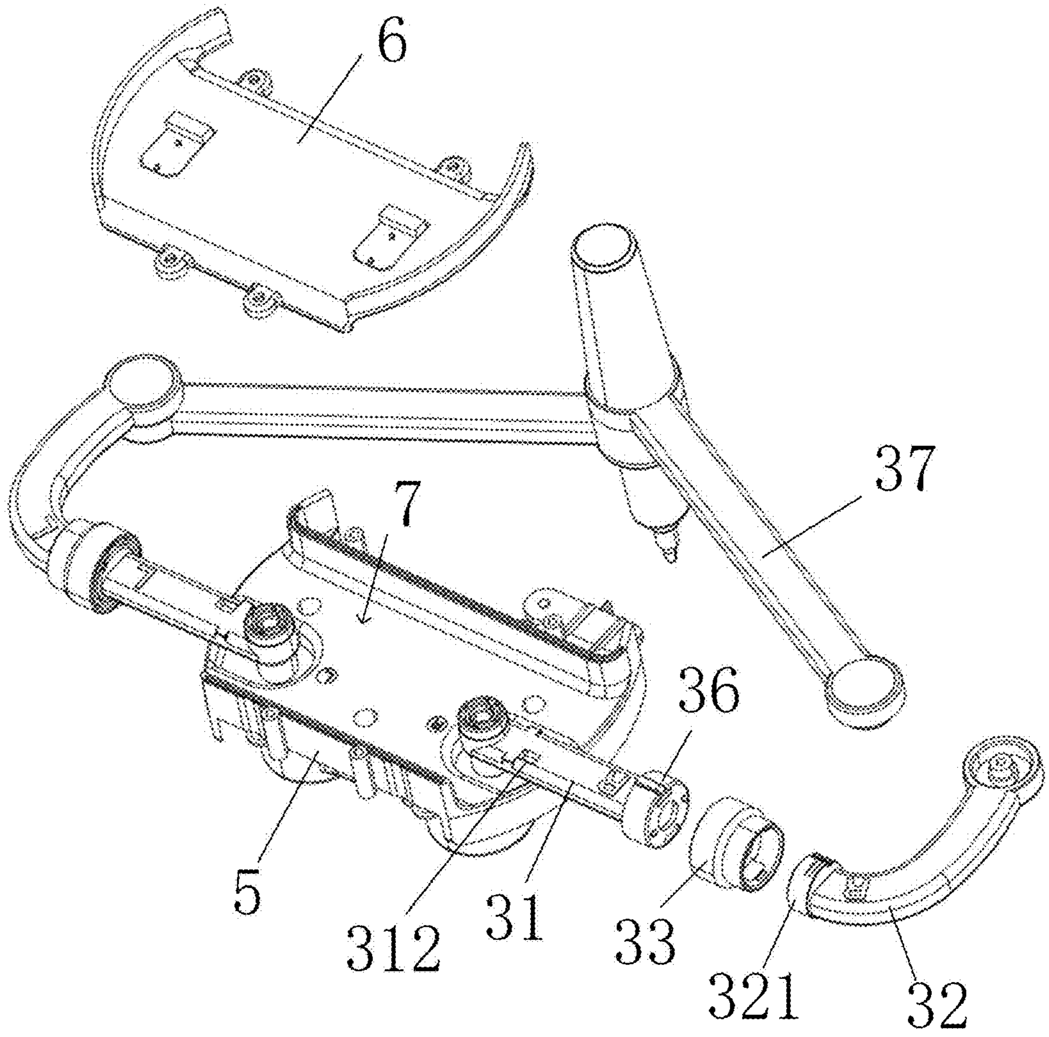
FIG. 4 is an exploded schematic diagram of an inner frame and the drawing arm mechanism according to an embodiment of this application.
Figure 5:
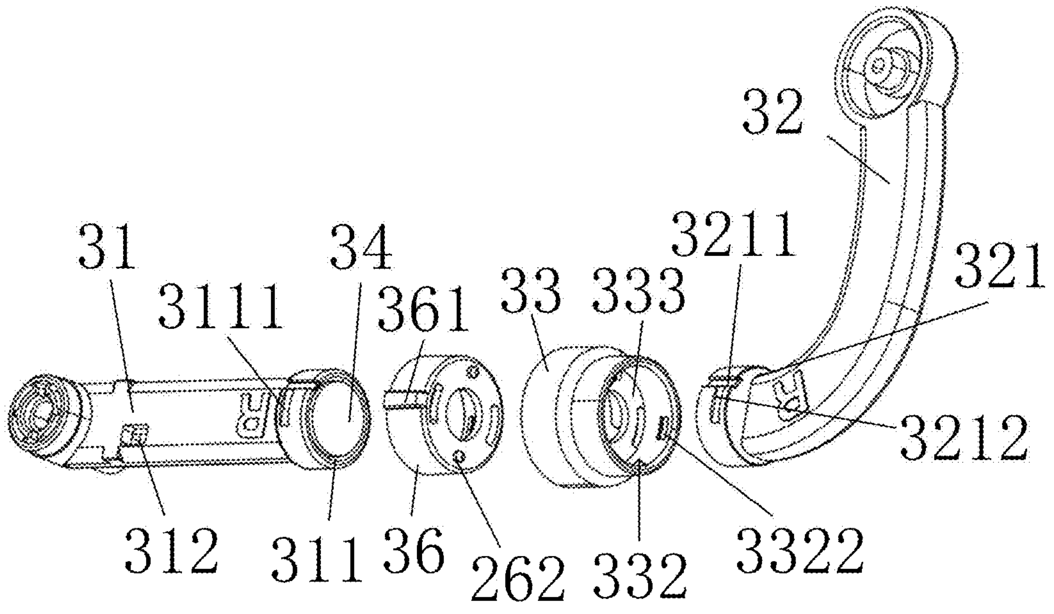
FIG. 5 is an exploded schematic diagram of the drawing arm mechanism according to an embodiment of this application.
Figure 6:
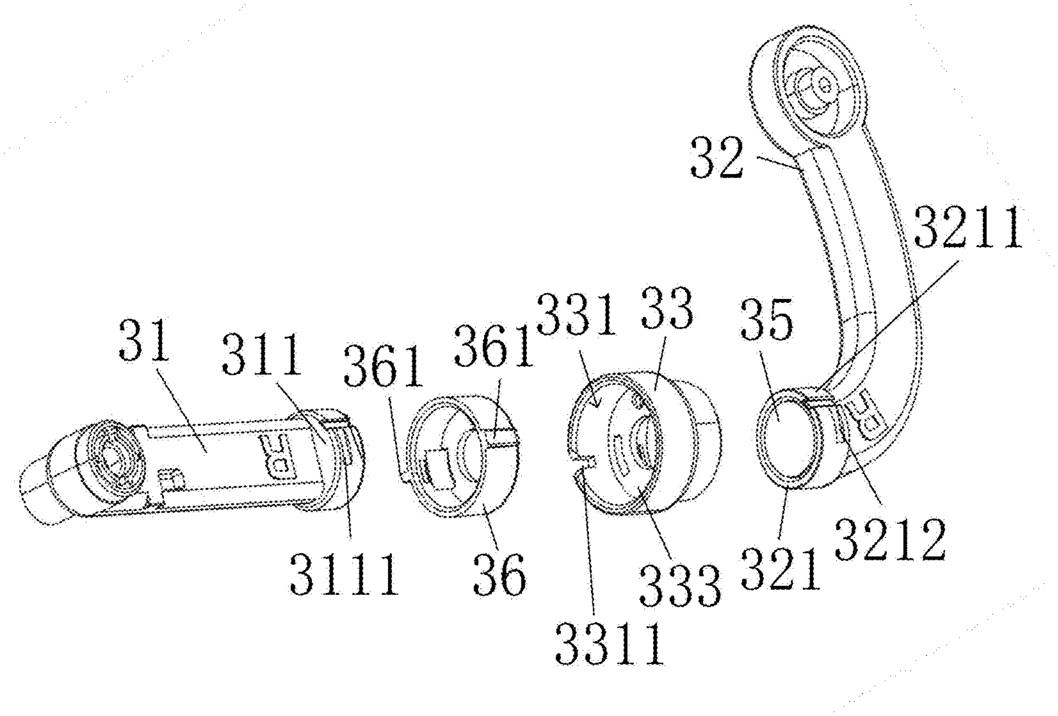
FIG. 6 is another exploded schematic diagram of the drawing arm mechanism according to an embodiment of this application.
Figure 7:
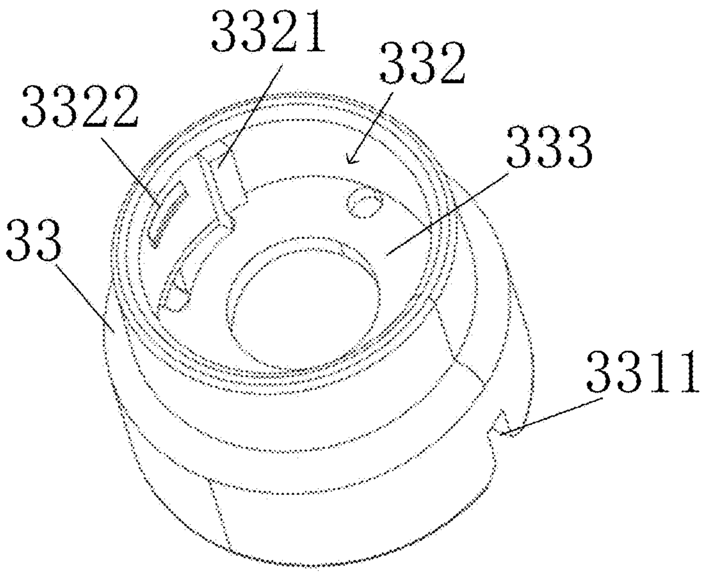
FIG. 7 is a schematic diagram of a sleeving member according to an embodiment of this application.

1. housing; 11. arm extension port; 12. upper housing; 121. card slot; 13. lower housing; 2. drive mechanism; 21. lift drive assembly; 211. motor; 212. gear; 213. transmission support; 2131. support plate; 2132. transmission connection block; 21321. meshing teeth; 22. rotation drive member; 3. drawing arm mechanism; 31. first connection arm; 311. first mounting cavity; 3111. second snap slot; 312. clamping hole; 32. second connection arm; 321. second mounting cavity; 3211. second limiting slot; 3212. first snap slot; 33. sleeving member; 331. first sleeving cavity; 3311. foolproof slot; 332. second sleeving cavity; 3321. limiting rib; 3322. first snap protrusion; 333. partition plate; 3331. limiting hole; 34. first magnetic piece; 35. second magnetic piece; 36. sleeving cover; 361. foolproof rib; 362. limiting protrusion; 363. second snap protrusion; 37. third connection arm; 38. pen sleeve; 4. drawing pen; 5. base; 51. mounting groove; 52. guide hole; 6. inner frame; 7. inner transmission cavity; 8. Hall angle sensor; 9. top seat; 10. main control circuit board; 20. battery; 40. guide post; 50. identification circuit board; 60. card; 70. visual recognition module; and 701. camera.

DESCRIPTION OF THE EMBODIMENTS

It should be noted that, in the absence of conflict, the embodiments in this application and the features in the embodiments can be combined with each other. The preferred embodiments of this application will now be described in detail with reference to the drawings.

According to an embodiment of this application, a card-reading drawing robot is provided. As shown in FIGS. 1 to 8, the card-reading drawing robot includes a housing 1, a drive mechanism 2, and a drawing arm mechanism 3. The drive mechanism 2 is mounted in the housing 1, the drawing arm mechanism 3 is configured to mount a drawing pen 4, and the drive mechanism 2 is configured to drive the drawing arm mechanism 3 to perform a drawing action.

The drawing arm mechanism 3 includes a first connection arm 31, a second connection arm 32, and a sleeving member 33, where two ends of the sleeving member 33 are respectively provided with a first sleeving cavity 331 and a second sleeving cavity 332, a first end of the first connection arm 31 is inserted into the first sleeving cavity 331, a second end of the first connection arm 31 is connected to the drive mechanism 2, and a first end of the second connection arm 32 is inserted into the second sleeving cavity 332. The first end of the first connection arm 31 is provided with a first magnetic piece 34, the first end of the second connection arm 32 is provided with a second magnetic piece 35, and the first magnetic piece 34 and the second magnetic piece 35 are magnetically attracted.

The first connection arm 31 and the second connection arm 32 of the card-reading drawing robot of this application are connected via the sleeving member 33, where two ends of the sleeving member 33 are respectively provided with the first sleeving cavity 331 and the second sleeving cavity 332; and the first end of the first connection arm 31 is inserted into the first sleeving cavity 331, and the first end of the second connection arm 32 is inserted into the second sleeving cavity 332. Additionally, the first end of the first connection arm 31 is provided with the first magnetic piece 34, the first end of the second connection arm 32 is provided with the second magnetic piece 35, and the first magnetic piece 34 and the second magnetic piece 35 are magnetically attracted. Thus, since the first end of the first connection arm 31 is inserted into the first sleeving cavity 331 and the first end of the second connection arm 32 is inserted into the second sleeving cavity 332, mounting is more secure compared to the C-shaped slot clamping, and the magnetic attraction between the first magnetic piece 34 and the second magnetic piece 35 further enhances the firmness between the first connection arm 31 and the second connection arm 32.

Specifically, the first end of the first connection arm 31 is provided with a first mounting cavity 311, the first magnetic piece is mounted in the first mounting cavity 311, the first end of the second connection arm 32 is provided with a second mounting cavity 321, and the second magnetic piece 35 is mounted in the second mounting cavity 321. Providing the first mounting cavity 311 and the second mounting cavity 321 facilitates the mounting and fixation of the first magnetic piece 34 and the second magnetic piece 35, improving the ease of mounting and firmness of the first magnetic piece 34 and the second magnetic piece 35. Specifically, the first magnetic piece 34 and the second magnetic piece 35 may be securely adhered in the first mounting cavity 311 and the second mounting cavity 321 using glue. For the first magnetic piece 34 and the second magnetic piece 35, both may be magnets to achieve magnetic attraction, or one may be a magnet and the other may be a metal capable of magnetic attraction with the magnet, such as an iron piece.

The first mounting cavity 311 is detachably inserted into the first sleeving cavity 331, and the second mounting cavity 321 is fixedly inserted into the second sleeving cavity 332. Thus, the second connection arm 32 is fixedly connected to the sleeving member 33, while the first connection arm 31 is detachably connected to the sleeving member 33, facilitating the assembly and disassembly of the second connection arm 32, which is convenient for assembly during production and disassembly during packaging and transportation. Due to the presence of the first magnetic piece 34 and the second magnetic piece 35, the first mounting cavity 311 can be detachably inserted into the first sleeving cavity 331. For the fixed connection between the second connection arm 32 and the sleeving member 33, in an optional embodiment, the second mounting cavity 321 may be directly adhered to the second sleeving cavity 332 using glue. In another optional embodiment, an outer peripheral wall of the second mounting cavity 321 is circumferentially provided with a first snap slot 3212, an inner peripheral wall of the second sleeving cavity 332 is circumferentially provided with a first snap protrusion 3322, and the first snap protrusion 3322 is snapped into the first snap slot 3212, achieving the fixed connection between the second connection arm 32 and the sleeving member 33.

Specifically, the drawing arm mechanism 3 further includes a sleeving cover 36, the sleeving cover 36 is provided on the first mounting cavity 311, and the first end of the first connection arm 31 is inserted into the first sleeving cavity 331 via the sleeving cover 36. The sleeving cover 36 can further cover the first mounting cavity 311, preventing the first magnetic piece 34 from detaching from the first mounting cavity 311. Similarly, in an optional embodiment, the sleeving cover 36 may be directly adhered to the first mounting cavity 311 using glue, or in another optional embodiment, an outer peripheral wall of the first mounting cavity 311 is circumferentially provided with a second snap slot 3111, an inner peripheral wall of the sleeving cover 36 is circumferentially provided with a second snap protrusion 363, and the second snap protrusion 363 is snapped into the second snap slot 3111, achieving the mounting and fixation of the sleeving cover 36.

Figure 8:
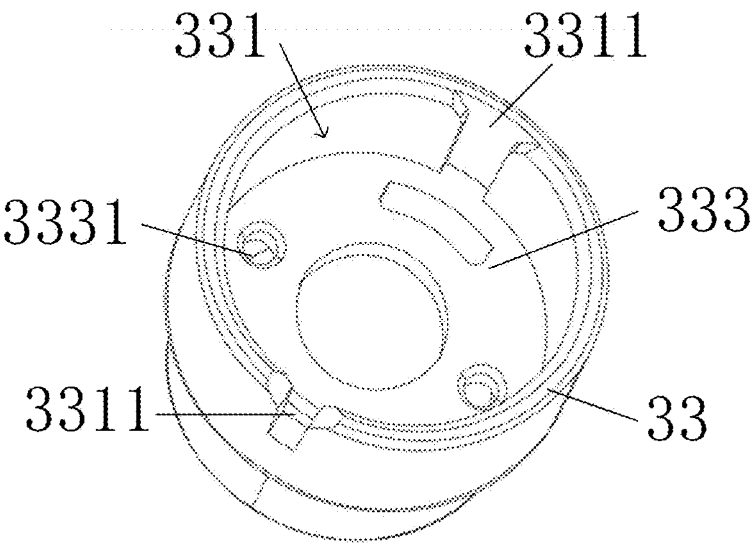
FIG. 8 is another schematic diagram of the sleeving member according to an embodiment of this application.
Figure 10:
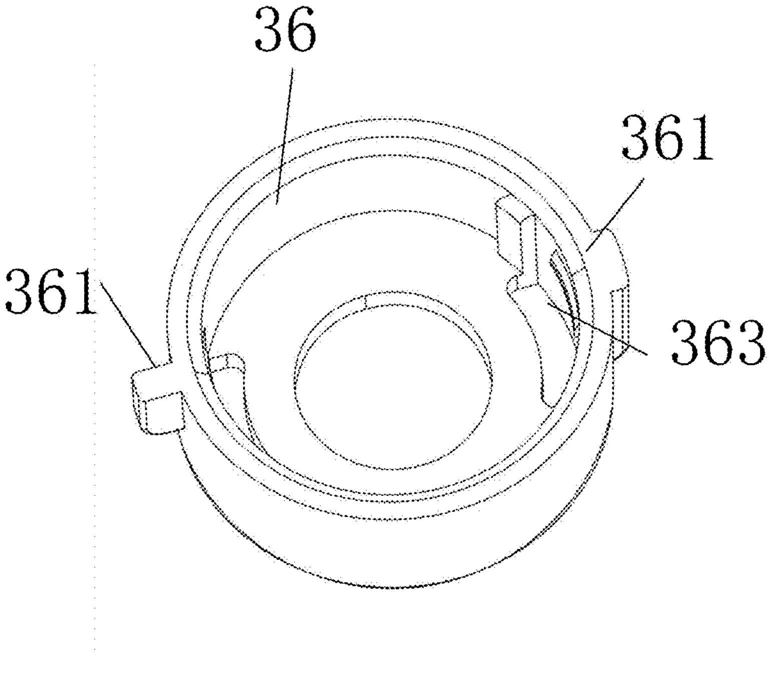
FIG. 10 is a schematic diagram of a sleeving cover according to an embodiment of this application.

Referring to FIGS. 8 and 10, two foolproof ribs 361 with different shapes are oppositely disposed on an outer peripheral wall of the sleeving cover 36, and a peripheral wall of the first sleeving cavity 331 is provided with two foolproof slots 3311 respectively corresponding to the two foolproof ribs 361. Through the corresponding cooperation of the two foolproof ribs 361 and the two foolproof slots 3311, the correct mounting of the sleeving cover 36 with the first sleeving cavity 331 can be ensured, and the limiting function of the foolproof ribs 361 and foolproof slots 3311 can enhance the connection stability between the sleeving cover 36 and the first sleeving cavity 331.

Specifically, among the two foolproof ribs 361, one foolproof rib 361 extends axially longer than the other foolproof rib 361, while the shorter foolproof rib 361 has a greater radial height than the longer foolproof rib 361. Correspondingly, the two foolproof slots 3311 are adapted to the two foolproof ribs 361, where one foolproof slot 3311 is a recess that does not penetrate the peripheral wall of the first sleeving cavity 331, and the other foolproof slot 3311 is an open slot that penetrates the peripheral wall of the first sleeving cavity 331.

Further, the sleeving member 33 has a partition plate 333 separating the first sleeving cavity 331 and the second sleeving cavity 332, a bottom of the sleeving cover 36 is provided with a limiting protrusion 362, the partition plate 333 is provided with a first limiting slot or limiting hole 3331 corresponding to the limiting protrusion 362, and the limiting protrusion 362 is inserted into the first limiting slot or limiting hole 3331. Through the cooperation of the limiting protrusion 362 with the first limiting slot or limiting hole 3331, the connection between the sleeving cover 36 and the sleeving member 33 can be further limited, enhancing connection stability. Specifically, two limiting protrusions 362 are oppositely provided, and two first limiting slots or limiting holes 3331 are correspondingly provided.

Further, an outer peripheral wall of the second mounting cavity 321 is axially provided with a second limiting slot 3211, an inner peripheral wall of the second sleeving cavity 332 is axially provided with a limiting rib 3321, and the limiting rib 3321 is embedded in the second limiting slot 3211. The cooperation of the second limiting slot 3211 and the limiting rib 3321 can prevent rotation between the second mounting cavity 321 and the second sleeving cavity 332, improving mounting stability.

Further, the drawing arm mechanism 3 also includes a third connection arm 37 and a pen sleeve 38. One end of the third connection arm 37 is rotatably connected to the second connection arm 32 via a pivot, and the other end rotatably sleeves the pen sleeve 38, the pen sleeve 38 being configured to hold the drawing pen 4. The pen sleeve 38 is located at the front of the housing 1, and the second connection arm 32 is bent toward the front of the housing 1.

Specifically, there are two sets of first connection arms 31, second connection arms 32, and third connection arms 37. One set of first connection arm 31, second connection arm 32, and third connection arm 37 is arranged on the left side of the housing 1, and the other set of first connection arm 31, second connection arm 32, and third connection arm 37 is arranged on the right side of the housing 1. Both third connection arms 37 rotatably sleeve the pen sleeve 38, driving the drawing pen 4 to perform drawing actions.

Further, the card-reading drawing robot further includes a base 5 and an inner frame 6 liftably mounted in the housing 1, and the inner frame 6 covers the base 5 to form an inner transmission cavity 7. The drive mechanism 2 includes a lift drive assembly 21 and a rotation drive member 22, the lift drive assembly 21 is drivingly connected to the base 5 to drive the base 5 to ascend and descend, and the rotation drive member 22 is mounted at a bottom of the base 5.

In the inner transmission cavity, the base 5 is recessed with a mounting groove 51, a drive shaft of the rotation drive member 22 passes through the mounting groove 51 and extends into the inner transmission cavity 7, and the second end of the first connection arm 31 is mounted on the drive shaft of the rotation drive member 22 and located at the mounting groove 51. The sidewall of the housing 1 is provided with an arm extension port 11, and the first connection arm 31 extends out from the arm extension port 11.

Figure 11:
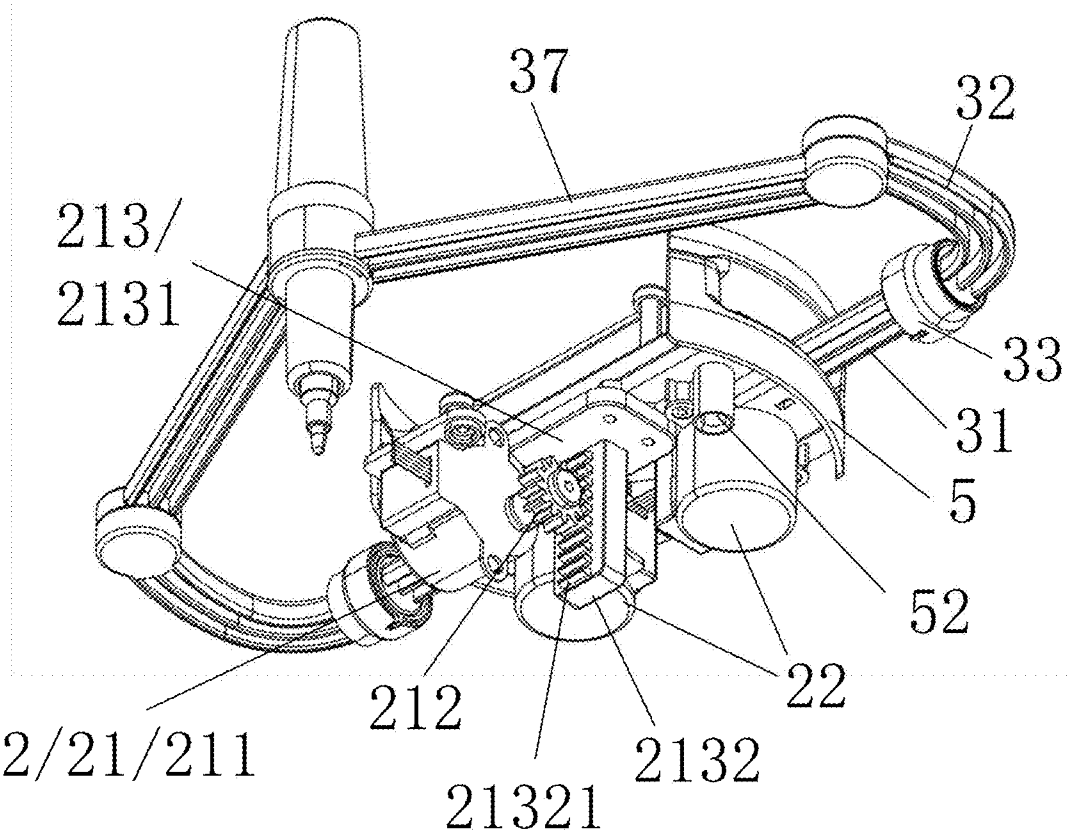
FIG. 11 is a schematic diagram of a drive mechanism according to an embodiment of this application.

As shown in FIG. 11, the lift drive assembly 21 drives the base 5 to ascend and descend, thereby driving the entire drawing arm mechanism 3 to ascend and descend, facilitating the execution of drawing actions. The mounting groove 51 recessed on the base 5 can reduce the space requirements of the inner transmission cavity. The rotation drive member 22 is a stepper motor, which is mounted to the bottom of the base 5 with screws. Specifically, two stepper motors are provided, connected to the second ends of the two first connection arms 31, respectively. When the stepper motor rotates, it drives the first connection arm 31 to rotate, and the first connection arm 31 sequentially drives the drawing pen 4 to perform drawing actions via the second connection arm 32, the third connection arm 37, and the pen sleeve 38. Since the second connection arm 32, the third connection arm 37, and the pen sleeve 38 are all rotatably connected, the drawing arm mechanism 3 can flexibly and easily perform drawing actions.

The lift drive assembly 21 includes a motor 211, a gear 212, and a transmission support 213. The motor 211 is mounted in the housing 1, the gear 212 is mounted on the drive shaft of the motor 211, and the transmission support 213 includes a support plate 2131 and a transmission connection block 2132 connected to the bottom of the support plate 2131. The support plate 2131 is mounted to the bottom of the base 5 with screws, the transmission connection block 2132 is axially provided with multiple meshing teeth 21321, and the gear 212 engages with the meshing teeth 21321. When the motor 211 operates, power transmission is achieved through the engagement of the gear 212 with the meshing teeth 21321, driving the base 5 to ascend and descend via the transmission support 213, thereby driving the entire drawing arm mechanism 3 to ascend and descend.

A torsion spring (not shown in the figure) sleeves the second end of the first connection arm 31, one end of the torsion spring is fixed in the mounting groove 51, and the other end is fixed to the first connection arm 31. The rotation drive member 22, such as a stepper motor, typically has rotation errors during driving. A torsion spring can improve the rotational accuracy of the rotation drive member 22 when the rotation drive member 22 stops driving. Specifically, the first connection arm 31 is provided with a clamping hole 312 near its second end, the bottom of the mounting groove 51 is provided with a hook (not shown in the figure), and the two ends of the torsion spring are respectively clamped in the clamping hole 312 and the hook.

Figure 9:
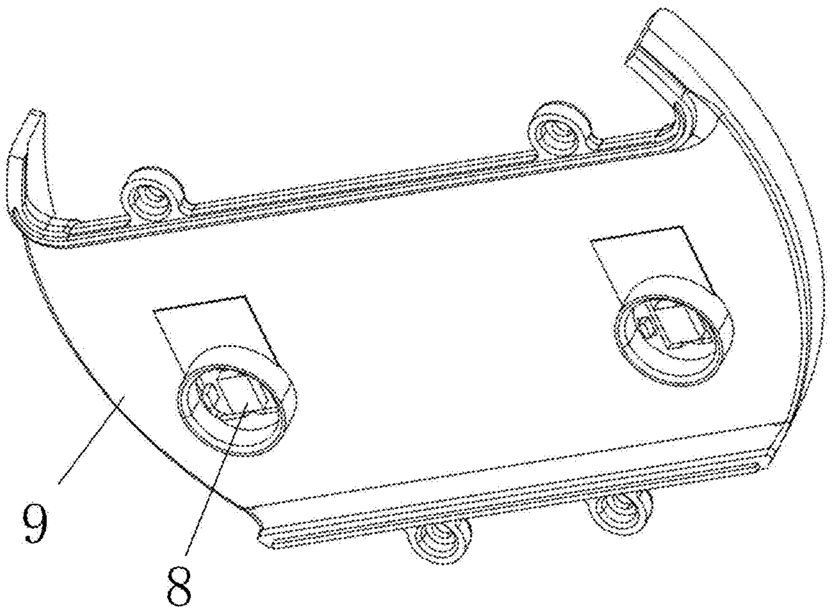
FIG. 9 is a schematic diagram of a top seat according to an embodiment of this application.

Referring to FIG. 9, a magnet (not shown in the figure) is mounted at an end of the second end of the first connection arm 31 away from the mounting groove 51, a Hall angle sensor 8 is mounted on the inner frame 6 corresponding to the magnet, and the Hall angle sensor 8 is configured to detect a rotation angle of the first connection arm 31. When the first connection arm 31 rotates, the Hall angle sensor 8 detects changes in the magnetic field of the magnet, allowing the rotation angle of the first connection arm 31 to be detected, thereby facilitating the execution and control of drawing actions.

Specifically, the housing 1 includes an upper housing 12 and a lower housing 13 assembled in a mutually fitting manner, the card-reading drawing robot further includes a top seat 9, and the top seat 9 is mounted in the upper housing 12 and covers the inner frame 6 within the housing 1. A main control circuit board 10 and a battery 20 are mounted on the top seat 9, and the main control circuit board 10 is electrically connected to the battery 20, the lift drive assembly 21, and the rotation drive member 22. The battery 20 can provide power support for the card-reading drawing robot. The motor 211 is mounted in the lower housing 13, and the lower housing 13 is also provided with at least two guide posts 40. The base 5 is correspondingly provided with guide holes 52, and the guide posts 40 are respectively inserted into the guide holes 52. When the base 5 is driven to ascend and descend, the guide holes 52 move along the guide posts 40, and the cooperation of the guide posts 40 and guide holes 52 improves the lifting stability of the base 5, thereby enhancing the lifting stability of the drawing arm mechanism 3.

Figure 12:
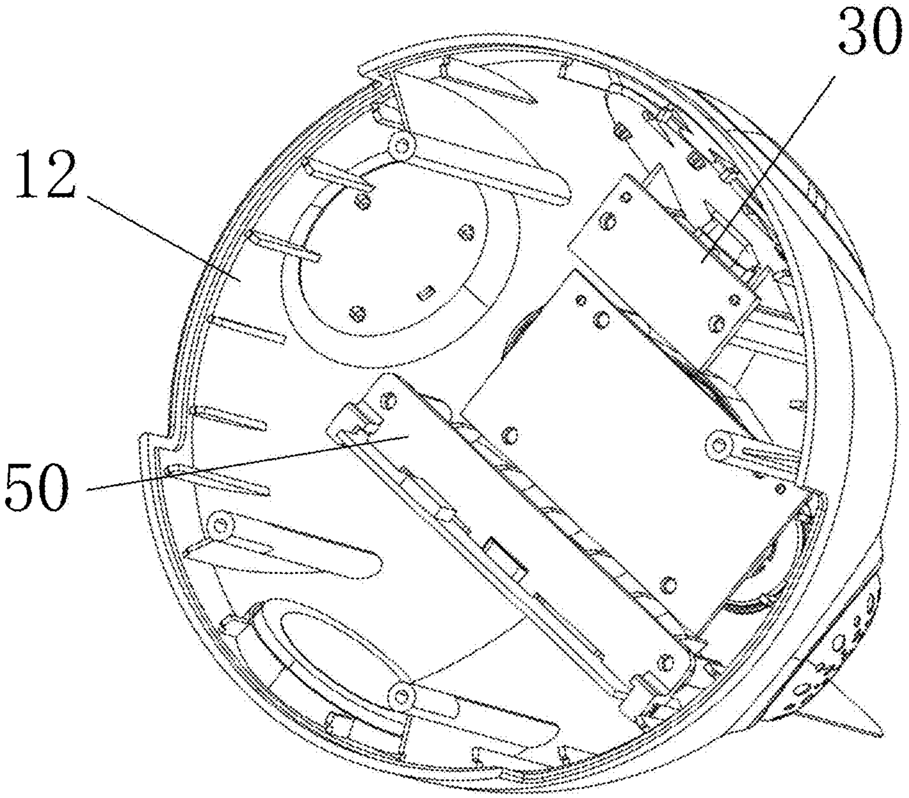
FIG. 12 is a schematic diagram of a lower housing according to an embodiment of this application.

As shown in FIG. 12, the upper housing 12 and the lower housing 13 are provided with notches, which are aligned to form the arm extension port 11. The top of the upper housing 12 is provided with a card slot 121, and an identification circuit board 50 is mounted inside the upper housing 12 corresponding to the card slot 121. The identification circuit board 50 is electrically connected to the main control circuit board 10. In use, the user inserts a matching card 60 into the card slot 121 to start the card-reading drawing robot. After the identification circuit board 50 recognizes the content data of the card 60, it transmits the content data to the main control circuit board 10. The main control circuit board 10 controls the motor 211 or stepper motor to drive the drawing arm mechanism 3, thereby driving the drawing pen 4 to perform a drawing action.

Specifically, the housing 1 is further provided with a visual recognition module, the visual recognition module is configured to recognize an object within a visual range, and the card-reading drawing robot executes a drawing action based on visual recognition information. Specifically, the visual recognition module includes a camera 701 mounted at the front end of the upper housing 12. The camera 701 is electrically connected to the main control circuit board 10 via a circuit board. The camera 701 visually recognizes and acquires the shape and feature information of the object placed within the visual range, and the card-reading drawing robot performs a drawing action based on the acquired shape and feature information, drawing the object with a corresponding shape and features. The visual recognition, acquisition of shape and feature information of the object, and related processing of visual information data via the camera 701 can be implemented in a manner known to those skilled in the art, and will not be further described herein.

Further, the card-reading drawing robot is also provided with necessary components such as a switch button and a charging interface, which can be implemented in a manner known to those skilled in the art, and will not be further described in detail herein.

It should be understood that the above embodiments are only used to illustrate the technical solutions of this application and are not intended to limit them. For those skilled in the art, the technical solutions described in the above embodiments can be modified, or some technical features can be equivalently replaced, and all such modifications and replacements should fall within the scope of protection of the claims attached to this application.

What is claimed is:

1. A card-reading drawing robot, comprising a housing, a drive mechanism, and a drawing arm mechanism, wherein the drive mechanism is mounted in the housing, the drawing arm mechanism is configured to mount a drawing pen, and the drive mechanism is configured to drive the drawing arm mechanism to perform a drawing action;

the drawing arm mechanism comprises a first connection arm, a second connection arm, and a sleeving member, wherein two ends of the sleeving member are respectively provided with a first sleeving cavity and a second sleeving cavity, a first end of the first connection arm is inserted into the first sleeving cavity, a second end of the first connection arm is connected to the drive mechanism, and a first end of the second connection arm is inserted into the second sleeving cavity; and the first end of the first connection arm is provided with a first magnetic piece, the first end of the second connection arm is provided with a second magnetic piece, and the first magnetic piece and the second magnetic piece are magnetically attracted.

2. The card-reading drawing robot according to claim 1, wherein the first end of the first connection arm is provided with a first mounting cavity, the first magnetic piece is mounted in the first mounting cavity, the first end of the second connection arm is provided with a second mounting cavity, and the second magnetic piece is mounted in the second mounting cavity; and the first mounting cavity is detachably inserted into the first sleeving cavity, and the second mounting cavity is fixedly inserted into the second sleeving cavity.

3. The card-reading drawing robot according to claim 2, wherein the drawing arm mechanism further comprises a sleeving cover, and the first end of the first connection arm is inserted into the first sleeving cavity via the sleeving cover.

4. The card-reading drawing robot according to claim 3, wherein two foolproof ribs with different shapes are oppositely disposed on an outer peripheral wall of the sleeving cover, and a peripheral wall of the first sleeving cavity is provided with two foolproof slots respectively corresponding to the two foolproof ribs; and/or the sleeving member has a partition plate separating the first sleeving cavity and the second sleeving cavity, a bottom of the sleeving cover is provided with a limiting protrusion, the partition plate is provided with a first limiting slot or a limiting hole corresponding to the limiting protrusion, and the limiting protrusion is inserted into the first limiting slot or the limiting hole.

5. The card-reading drawing robot according to claim 3, wherein the card-reading drawing robot further comprises a base and an inner frame liftably mounted in the housing, and the inner frame covers the base to form an inner transmission cavity;

the drive mechanism comprises a lift drive assembly and a rotation drive member, the lift drive assembly is drivingly connected to the base, so as to drive the base to ascend and descend, and the rotation drive member is mounted at a bottom of the base; and in the inner transmission cavity, the base is recessed with a mounting groove, a drive shaft of the rotation drive member passes through the mounting groove and extends into the inner transmission cavity, and the second end of the first connection arm is mounted on the drive shaft of the rotation drive member and located at the mounting groove.

6. The card-reading drawing robot according to claim 2, wherein an outer peripheral wall of the second mounting cavity is axially provided with a second limiting slot, an inner peripheral wall of the second sleeving cavity is axially provided with a limiting rib, and the limiting rib is embedded in the second limiting slot; and/or the outer peripheral wall of the second mounting cavity is circumferentially provided with a first snap slot, the inner peripheral wall of the second sleeving cavity is circumferentially provided with a first snap protrusion, and the first snap protrusion is snapped into the first snap slot.

7. The card-reading drawing robot according to claim 2, wherein the card-reading drawing robot further comprises a base and an inner frame liftably mounted in the housing, and the inner frame covers the base to form an inner transmission cavity;

the drive mechanism comprises a lift drive assembly and a rotation drive member, the lift drive assembly is drivingly connected to the base, so as to drive the base to ascend and descend, and the rotation drive member is mounted at a bottom of the base; and in the inner transmission cavity, the base is recessed with a mounting groove, a drive shaft of the rotation drive member passes through the mounting groove and extends into the inner transmission cavity, and the second end of the first connection arm is mounted on the drive shaft of the rotation drive member and located at the mounting groove.

8. The card-reading drawing robot according to claim 1, wherein the card-reading drawing robot further comprises a base and an inner frame liftably mounted in the housing, and the inner frame covers the base to form an inner transmission cavity;

the drive mechanism comprises a lift drive assembly and a rotation drive member, the lift drive assembly is drivingly connected to the base, so as to drive the base to ascend and descend, and the rotation drive member is mounted at a bottom of the base; and in the inner transmission cavity, the base is recessed with a mounting groove, a drive shaft of the rotation drive member passes through the mounting groove and extends into the inner transmission cavity, and the second end of the first connection arm is mounted on the drive shaft of the rotation drive member and located at the mounting groove.

9. The card-reading drawing robot according to claim 8, wherein a torsion spring sleeves the second end of the first connection arm, one end of the torsion spring is fixed in the mounting groove, and the other end is fixed to the first connection arm.

10. The card-reading drawing robot according to claim 9, wherein a magnet is mounted at an end of the second end of the first connection arm away from the mounting groove, a Hall angle sensor is mounted on the inner frame corresponding to the magnet, and the Hall angle sensor is configured to detect a rotation angle of the first connection arm.

11. The card-reading drawing robot according to claim 8, wherein the housing comprises an upper housing and a lower housing assembled in a mutually fitting manner, the card-reading drawing robot further comprises a top seat, and the top seat is mounted in the upper housing and covers the inner frame within the housing; and a main control circuit board and a battery are mounted on the top seat, and the main control circuit board is electrically connected to all the battery, the lift drive assembly, and the rotation drive member.

12. The card-reading drawing robot according to claim 11, wherein the housing is further provided with a visual recognition module, the visual recognition module is configured to recognize an object within a visual range, and the card-reading drawing robot executes a drawing action based on visual recognition information.

13. The card-reading drawing robot according to claim 8, wherein the housing is further provided with a visual recognition module, the visual recognition module is configured to recognize an object within a visual range, and the card-reading drawing robot executes a drawing action based on visual recognition information.

14. The card-reading drawing robot according to claim 1, wherein the housing is further provided with a visual recognition module, the visual recognition module is configured to recognize an object within a visual range, and the card-reading drawing robot executes a drawing action based on visual recognition information.

* * * * *